United States Patent Office 3,483,396
Patented Dec. 9, 1969

---

3,483,396
POLYPHASE ELECTRICAL COUPLINGS
Eric William Lightbody, Hale, and Leo Abram, Gatley, England, assignors to Associated Electrical Industries Limited, London, England, a British company
Filed Oct. 31, 1966, Ser. No. 590,762
Claims priority, application Great Britain, Nov. 3, 1965, 46,554/65
Int. Cl. H02g 15/08, 15/12
U.S. Cl. 307—147
8 Claims

ABSTRACT OF THE DISCLOSURE

A polyphase coupling arrangement between the output terminals of an electrical generator and a transformer includes liquid cooled coupling conductors for connecting each phase of the generator winding with the corresponding phase of the transformer and further liquid cooled conductors for connecting the generator winding with a neutral point. Flexible electrical connections between the phase conductors and the generator windings and flexible coolant couplings to the generator ends of the phase conductors permit thermal expansion of the conductors. Electrical connections between the ends of gas filled metal sheaths which surround each phase conductor permit circulation of induced currents.

---

This invention relates to polyphase electrical couplings between high voltage equipments and has an important application in couplings between an electrical generator, and a transformer fed from the generator. In such equipment the space available for the coupling is frequently limited and in many cases the only available space is underneath the generator.

It is however necessary in such equipment to avoid electrical breakdown between phases, to ensure that individual phase conductors are not displaced by the forces set up between adjacent phase conductors and to avoid overheating of the conductors.

The main object of the invention is to provide an improved construction which to an appreciable extent satisfies these requirements.

According to one aspect the invention comprises a polyphase electrical coupling between the output terminals of an electrical generator and a transformer including a coupling conductor between each phase of the generator and the corresponding phase of the transformer, a second conductor for each phase connecting the generator winding with a neutral point, individual phase conductors being located in separate gas filled sheathings and the phase sheathings being inter-connected electrically at the ends so that the induced currents tend to compensate magnetic attraction between the conductors, all the conductors being hollow and liquid cooled, flexible couplings inter-connecting the conductor coolant passages with the generator coolant system, flexible electrical connections between the conductors and associated generator terminals the conductors being fixedly mounted at points remote from the generator and the arrangement being such that the conductors can all expand thermally towards the generator.

The present invention also comprises a polyphase electrical coupling between the output terminals of an electrical generator and a transformer in which a coupling conductor for each phase is centrally located within a respective gas filled sheathing, the individual phase sheathings being inter-connected at both ends so that the induced currents tend to reduce magnetic attraction between the phase conductors, together with a second conductor associated with each phase and connecting the generator winding with a neutral point and extending within the phase sheath in substantially the opposite direction to the coupling conductor, all the conductors being hollow and liquid cooled, flexible coolant couplings interconnecting the coolant passages of each pair of phase conductors either directly or through the generator coolant system and flexible connections between the conductors and associated generator terminals, the arrangement being such that the conductors of each phase can expand towards each other within the sheath.

According to one arrangement the coolant passages of each pair of phase conductors are directly inter-connected by an arrangement including one or more substantially right angled ductings connecting each conductor passage with a common annular manifold. In such a case the coolant flow paths through the individual phases may be either in parallel or through one phase in series with the other two phases in parallel.

Alternatively the ends of the conductor coolant passages of each phase may be inter-connected through the coolant system of the corresponding phase of the generator by one or more substantially right angled ductings connecting the coolant passage of each conductor with the corresponding phase coolant system of the generator. In such a case the coolant for each phase enters at the remote end of either conductor passing through that conductor, then through the generator and through the other conductor before pasing out at the remote end of the latter conductor. The coolant flow paths through the individual phases being in parallel.

When the generator is of the hydrogen cooled type the flow in the first arrangement is preferably arranged to pass through the conductor system before flowing through the generator system and in the second arrangement the flow is preferably arranged to pass through the coupling conductor before flowing through the generator so as to limit as much as possible that part of the coolant system in which the coolant may be contaminated by hydrogen from the generator.

Preferably there are several ductings all feeding a single conductor passageway. The ductings may be of polytetrafluorethylene, referred to hereafter as P.T.F.E.

In order that compensating currents shall be induced in the sheaths to compensate the attractive forces between phase conductors the sheathings are preferably electrically continuous throughout their lengths and interphase connections of the sheathings are made at both ends.

The phase conductors are located centrally by insulators in their associated sheaths to reduce the electromagnetic forces and hence reduce the stresses on the insulators. The conductors should be able to move longitudinally a small amount to allow for thermal expansion.

The cooling liquid may be water of sufficient purity to have the requisite specific resistance, alternatively a suitable oil could be used.

After this the coolant from the system can be cooled and recirculated in a closed circuit.

Preferably the coolant is cooled by heat exchange with the feed water passing to the steam turbine driving the generator so the losses in the conductors are largely recovered and are not dissipated in the form of heat.

In order that the invention may be more clearly understood reference will now be made to the accompanying drawings in which:

FIG. 5 shows the connections at the transformer end.

FIG. 1 shows a coupling located underneath a generator having terminals extending downwards into the space underneath the generator.

FIG. 8 shows one arrangement of the coolant circuit in this arrangement the coolant flows from the pump P through the generator GE and the conductors in parallel flows.

The first flow passes from the pump through the generator supply pipe GS to the generator and returns through the duct GR and the hydrogen filter HF to the pump P.

The second flow passes from the pump P through the conductor supply duct CS and an insulating section 1 to the star point SP. From here it flows through the phase conductors in parallel, flowing first through the conductors C1 then through the couplings D and M, then through the conductors C2 and insulating sections L, and returns through the return duct CR and hydrogen filter HF to the pump.

Figure 9:
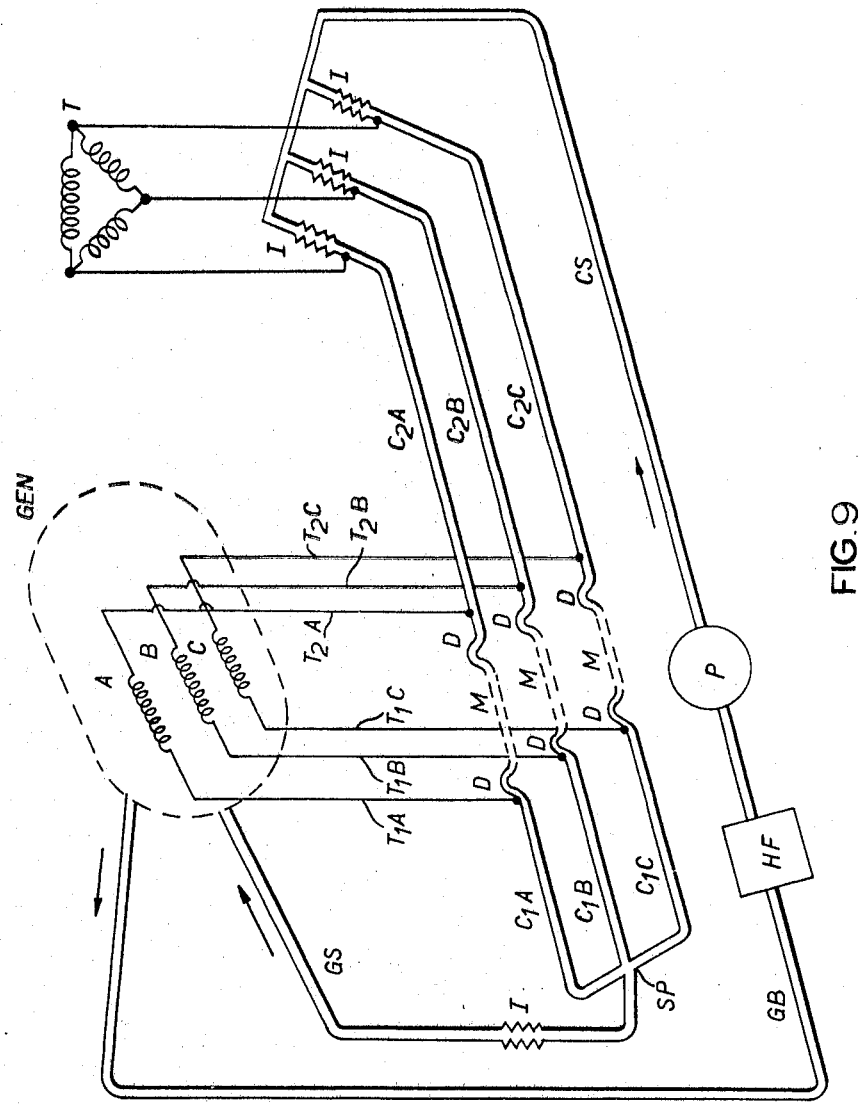

FIG. 9 shows another arrangement in which the liquid flows first through the conductors and then through the generator, the flow from the pump passing through the supply duct CS and then through the conductors C2 and C1 to the star point SP, from which the coolant flows through the generator winding and returns through the filter to the pump.

It is desirable that the coolant flows through the generator last if the latter is hydrogen cooled owing to the possibility of hydrogen being absorbed in the coolant liquid during its passage through the generator.

The conductor C1 is electrically connected to a star or neutral point SP whilst the conductor C2 extends to the right and is assumed connected to the corresponding phase terminal of the generator transformer (as shown in FIG. 5). Both conductors are located in a gas filled phase sheathing SA and supported on insulators IN.

The sheathing is mounted on suitable supporting structures B and the phase sheathings are inter-connected electrically at each end by plates A so that induced currents tend to compensate for the forces set up between the phase conductors.

The conductors are tubular and coolant is fed into the right hand end of conductor C2, it flows to the left along the conductor through the insulating coupling shown between the generator terminals and then through the conductor C1 to the star point SP.

Figure 4:
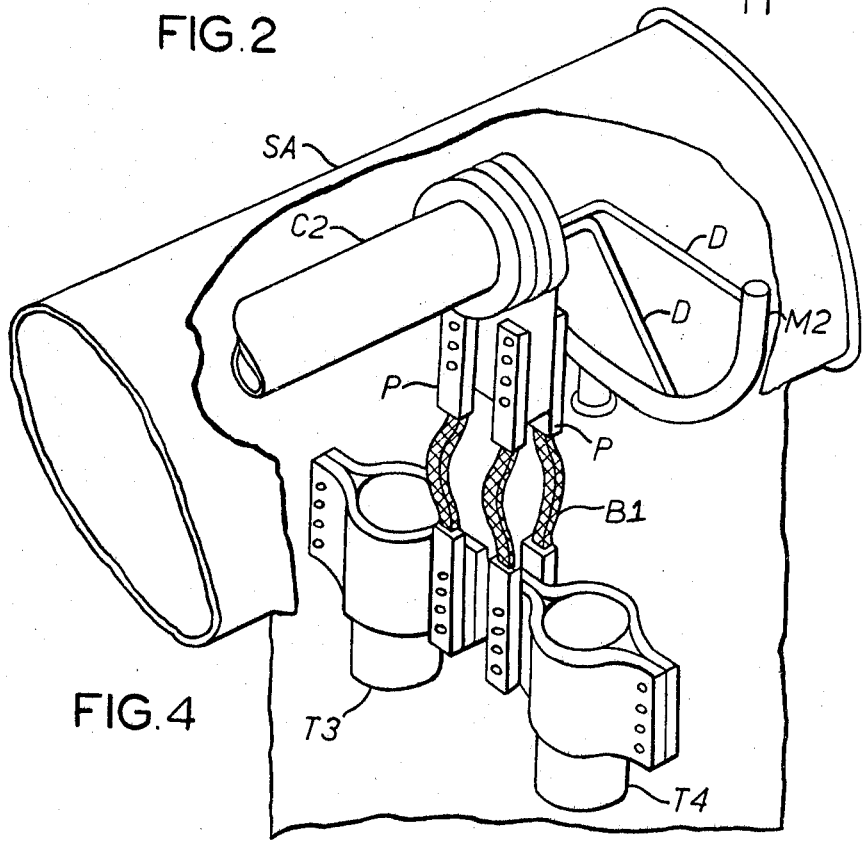
FIG. 4 is a cross sectional view on the line IV—IV of FIG. 1 showing the arrangement of the star point.

From the star point the coolant would flow through a heat exchanger and then be re-circulated. The coolant connections to the star point are shown in FIG. 4.

The reference CT indicates current transformers coupled to the neutral conductor C1, these transformers could be connected to protective apparatus for the plant.

Preferably the neutral conductor C1 is clamped at the star point SP so that it will expand towards the right i.e. towards the generator the flexible couplings at the generator make this possible, moreover the conductor would not be clamped to the insulators so that it can slide over them.

Similarly the coupling conductor C2 could be clamped at a point remote from the generator so that it would also expand towards the generator. Depending on the route of the conductor one or more clamps may be necessary along the run of this conductor. If necessary the coupling conductor C2 may be clamped at such a point that expansion takes place both towards the generator and towards the transformer so as to reduce the amount of expansion to be taken up by the flexible connections at the two ends of this conductor.

Figure 2:
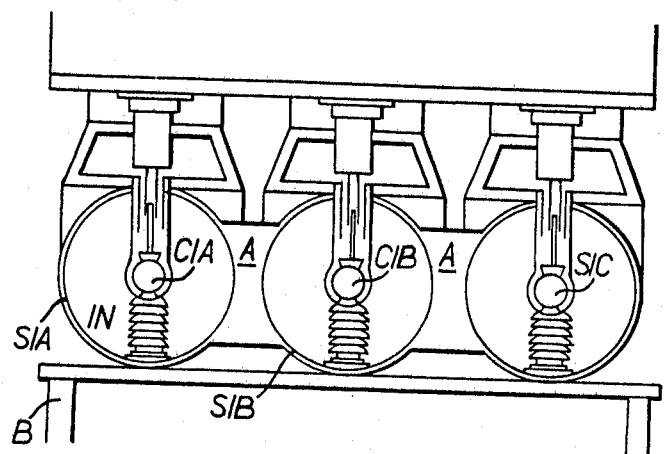
FIG. 2 is a cross section taken in a vertical plane on the line II—II of FIG. 1.

FIG. 2 is a cross sectional view showing the three phase conductors C1A, C1B and C1C mounted in respective sheathings S1A, S1B and S1C all three phases being supported on a suitable supporting structure B.

Figure 3:
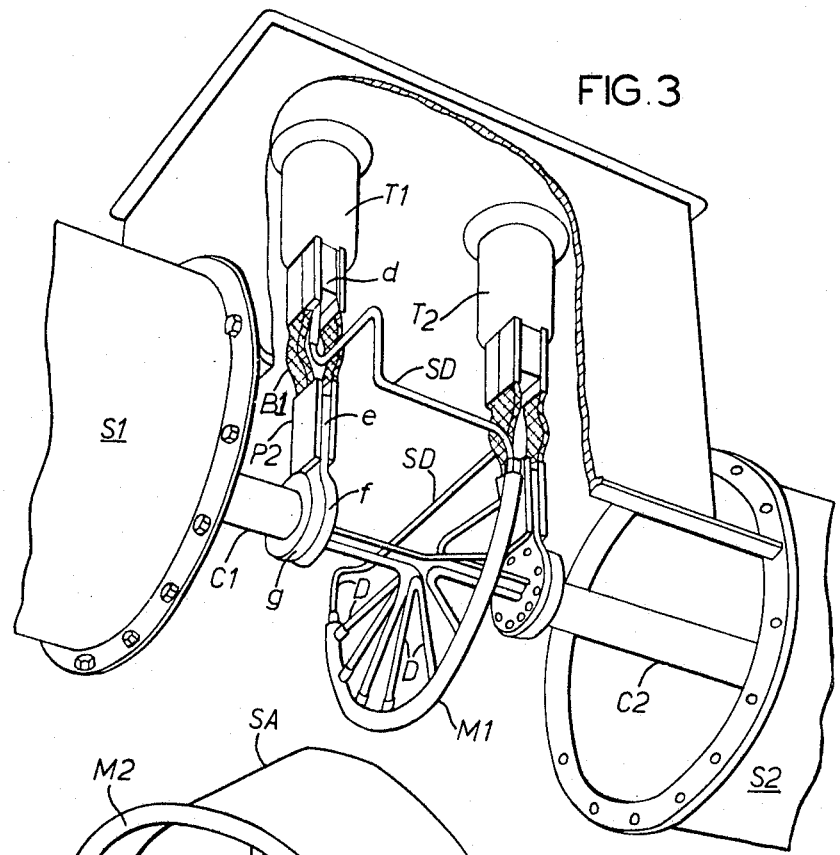
FIG. 3 is an underneath pictorial view showing the connections to the generator.
Figure 6:
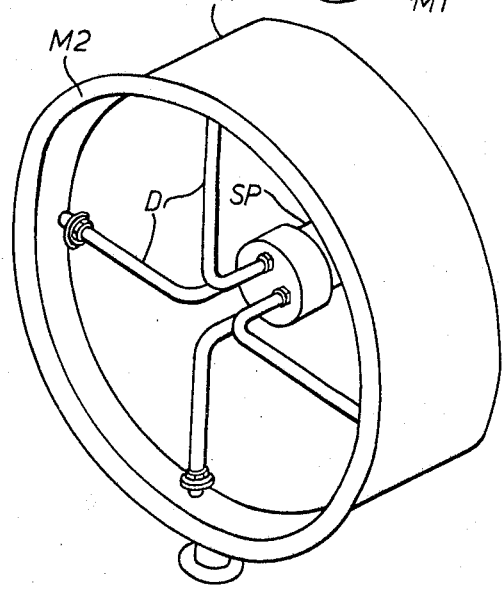
FIG. 6 shows how a liquid manifold may be carried on the end of the sheathing.

The electrical conections between the generator terminals T1 and T2 and the conductors C1, C2 are shown more clearly in FIG. 3, the electrical connection is made by a suitable flexible connector B1 extending between a block or palm $d$ on the terminal T1 and a similar block or palm $e$ which is an extension of an end plate $f$ which is bolted to a flange $g$ on the conductor C1, this flange being suitably secured to the conductor C1, e.g. by welding, swaging, or brazing. Alternatively the flange $g$ and plate $f$ may be a single piece brazed or welded to the end of the conductor and of hollow construction so that this end piece may also be water cooled.

The electrical connection between the terminal T2 and the conductor C2 would be similar.

Clearly other forms of electrical connection could be employed, for example the flexible connectors could extend axially between the member $d$ and $e$ which in such an arrangement would be displaced axially relatively to one another.

The hydraulic coupling between the generator ends of the conductors C1 and C2 comprises a manifold M1 supported by the sheathings and connected through one or more flexible ducts D to the tubular conductors.

It will be observed that each duct is bent through an angle of the order of 90° to allow for longitudinal expansion and transverse movement of the conductor. As above-mentioned the ducts are preferably of P.T.F.E.

By-pass ducts SD provide a by-pass circuit whereby some of the coolant may be diverted to cool the terminal.

FIG. 5 shows one of the phase couplings at the transformer end. T3 and T4 are the transformer terminals for the phase concerned and these terminals extend vertically upwards above the transformer. The electrical and hydraulic connections to the end of the conductor C2 are similar to those shown in FIG. 3 and have been given similar references, in this case however the conductor is above the terminals T3 and T4 instead of underneath as in FIG. 3. The manifold M2 is supported at the end of the sheathing SA.

It is assumed that suitable interphase connections are made between the sheathings of the different phases to enable induction of the compensating currents as above explained. These are not shown in the drawing.

FIG. 4 shows an arrangement of the star point. The phase conductors C1A, C1B, and C1C are all connected to a common bus bar SP forming the star point, this besides interconnecting the conductors electrically also receives the coolant liquid from all the phase conductors and for this purpose is of a tubular construction. The interior of SP is connected through ducts D to a manifold M2 from or to which the coolant flows through a discharge or supply pipe marked P.

The construction of the ducts D and manifold M may be the same as above described and shown in FIG. 3.

Figure 1:
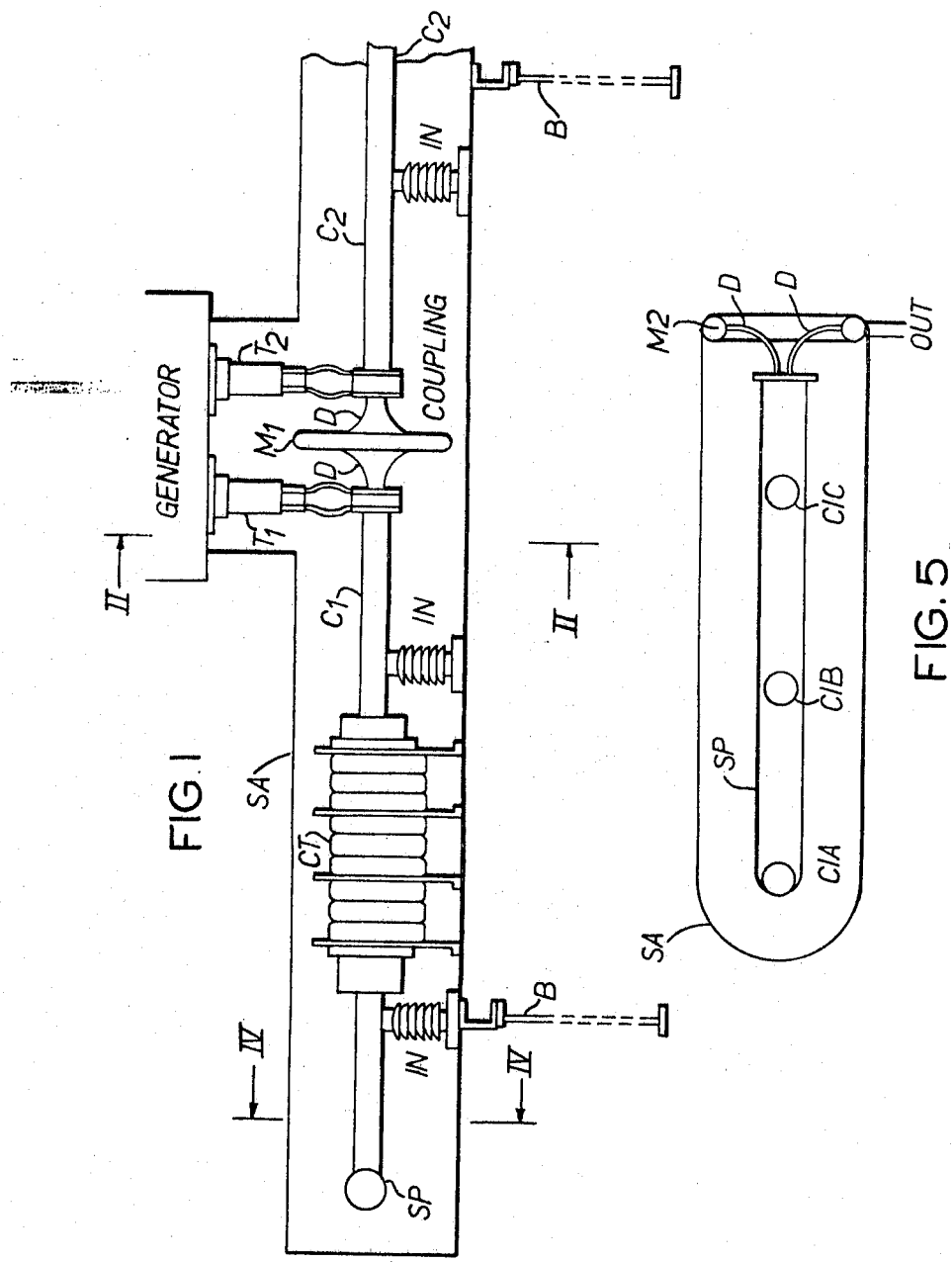
FIG. 1 is a side view partly in section, showing one phase of a polyphase coupling.

In some arrangements the coolant can be fed to and from the generator through the terminals T1 and T2 shown in FIG. 1, in such a case the manifold could be omitted and the ducts D arranged to connect the conductors C1 and C2 with the terminals T1 and T2 for flow of coolant.

The insulating supports are shown of conventional design and could be of a ceramic or of an epoxy resin.

Figure 7:
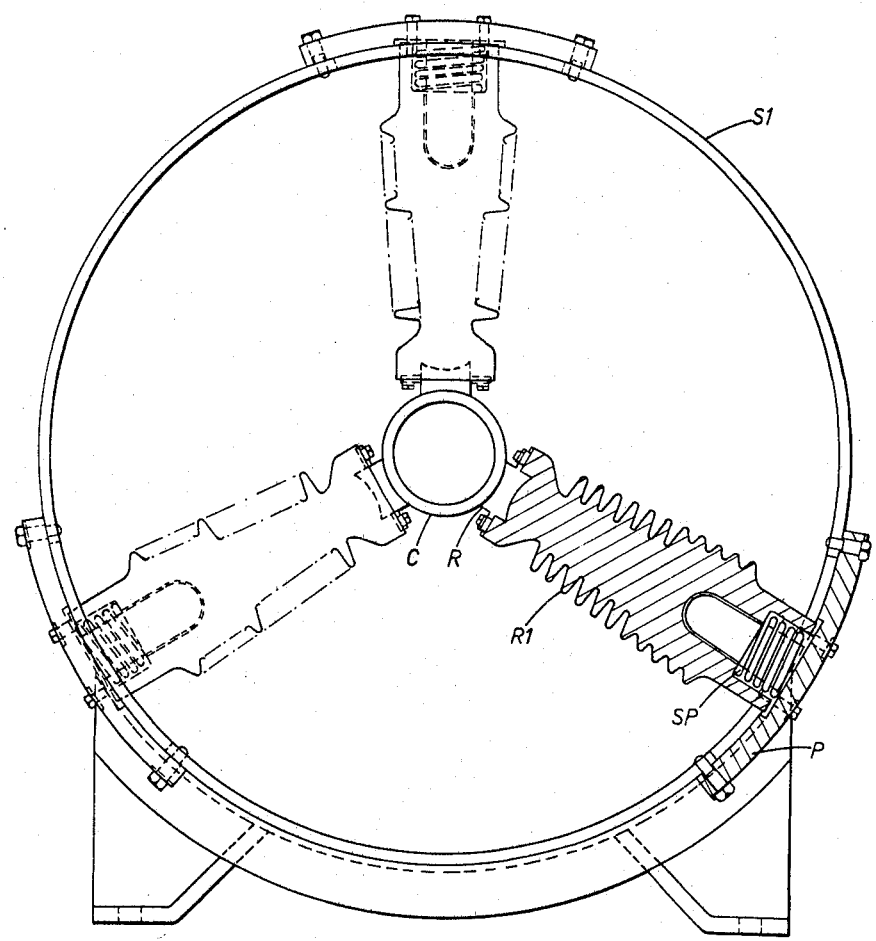
FIG. 7 is a section taken across the sheath showing a preferred arrangement of the support insulators.
Figure 8:
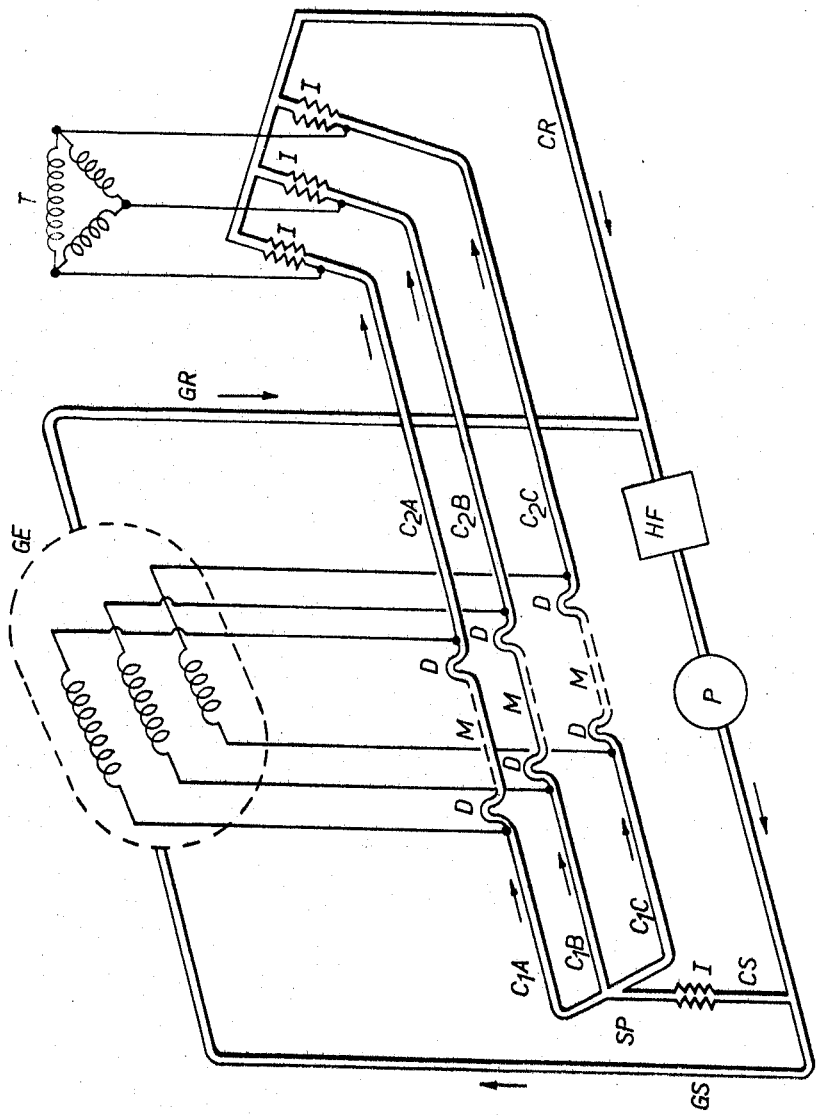
FIGS. 8 and 9 show two examples of the way in which the coolant circuit through the apparatus can be arranged.

FIG. 7 shows an alternative arrangement for locating the conductors in the sheaths, in the arrangement shown there are three insulators at each point of support. The insulators R1 extend radially from the conductors and are mounted on detachable cover plates P on the shield S1. They are mounted to have a small amount of radial movement and are pressed radially inwards by springs SP.

In the arrangement shown rollers R press against the conductor to allow axial movement of the conductor due to thermal expansion, the arrangement also has the advantage that greater tolerance in positioning the conductor within the sheath is permissible.

Another arrangement would be to use insulators in the form of discs or plates or spiders supporting the conductor at their centre and fitting into their sheath on their outside diameters.

Such insulators could be of epoxy resin and of split construction to facilitate installation and removal for inspection. An insulator at an end of a phase conductor could be used to feed coolant into or remove coolant from a conductor by forming it with a radial passage the inner end of which joins with the conductor passage. A suitable seal could be provided to allow for longitudinal movement of the conductor due to expansion but at the same time prevent leakage of the coolant. The outer end of the radial passage could be connected to a pipe passing through the sheath wall for connection to the external hydraulic system. The end of the conductor must of course be sealed and this could be done by an end closure plate.

In some cases it may be required to provide T-off connections to the conductors, usually at points between the generator and transformer.

Such connections would also be phase isolated and generally similar to the main connections but they need not be water cooled. Such conductors may either be tubular or sections or bars depending on the current rating. They may be connected to the phase conductor in question by a brazed, welded or bolted solid joint or by a flexible joint as B in FIG. 3.

The sheathing would be electrically continuous with the main phase conductor sheathing.

What we claim is:

1. A polyphase electrical coupling between the output terminals of an electrical generator and a transformer, comprising a liquid cooled coupling conductor connecting each phase of the generator winding with the corresponding phase of the transformer, a second liquid cooled conductor for each phase connecting the generator winding with a neutral point, means for fixedly clamping each of said conductors at a point remote from the generator, each of said conductors comprising a substantially rigid tube extending continuously between the clamping point and the generator, a gas filled metal sheath surrounding each phase conductor and radially spaced therefrom, electrical connections between the ends of the phase sheaths to permit circulation of the induced currents, and means comprising flexible electrical connections between the conductor and the generator winding and flexible coolant couplings to the generator ends of the conductors for permitting thermal expansion of the conductors.

2. A polyphase electrical coupling between the output terminals of an electrical generator and a transformer, comprising a liquid cooled coupling conductor connecting each phase of the generator winding with the corresponding phase of the transformer, a second liquid cooled conductor for each phase connecting the generator winding with a neutral point, the two conductors of each phase being substantially aligned, means for fixedly clamping each of said conductors at a point remote from the generator, each of said conductors comprising a substantially rigid tube extending continuously between the clamping point and the generator, a gas filled metal sheathing for each phase surrounding the two conductors of each phase, electrical interconnections between the ends of the phase sheathings, and means comprising flexible electrical connections between the conductors and the generator and flexible coolant connections to the generator ends of the conductors for permitting thermal expansion of the conductors of each phase towards each other.

3. A polyphase electrical coupling between the output terminals of an electrical generator and a transformer, comprising a liquid cooled coupling conductor connecting each phase of the generator winding with the corresponding phase of the transformer, a second liquid cooled conductor for each phase connecting the generator winding with a neutral point, the two conductors of each phase being substantially aligned, means for fixedly clamping each of said conductors at a point remote from the generator, each of said conductors comprising a substantially rigid tube extending continuously between the clamping point and the generator, a gas filled metal sheathing surrounding the two conductors of each phase, electrical interconnections between the ends of the phase sheathings to permit a path for induced currents, and means comprising flexible electrical connections between the conductors and the generator winding and flexible coolant couplings between the generator ends of the conductors phase pairs for permitting thermal expansion of the conductors of each phase pair towards each other, said couplings including right angled ducting connecting the conductor passages with manifolds located between the conductors, said manifolds extending at least partly along a circular path.

4. A polyphase electrical coupling between the output terminals of an electrical generator and a transformer, comprising a liquid cooled coupling conductor connecting each individual phase of the generator winding with the corresponding phase of the transformer, a second liquid cooled conductor for each phase connecting the generator winding with a neutral point, means for fixedly clamping each of said conductors at a point remote from the generator, each of said conductors comprising a substantially rigid tube extending continuously between the clamping point and the generator, a gas filled metal sheath surrounding each phase conductor and radially spaced therefrom, electrical connections between the ends of the phase sheaths to permit circulation of induced currents, means comprising flexible electrical connections between the conductors and the generator winding and flexible coolant couplings to the generator ends of the conductors for permitting thermal expansion of the conductors and means for circulating coolant in a closed circuit through the generator coolant system and through the conductor coolant passages.

5. A polyphase electrical coupling between the output terminals of a hydrogen cooled electrical generator and a transformer, comprising a liquid cooled coupling conductor connecting each individual phase of the generator winding with the corresponding phase of the transformer, a second liquid cooled conductor for each phase connecting the generator winding with a neutral point, means for fixedly clamping each of said conductors at a point remote from the generator, each of said conductors comprising a substantially rigid tube extending continuously between the clamping point and the generator, a gas filled metal sheath surrounding each phase conductor and radially spaced therefrom, electrical connections between the ends of the phase sheaths to permit circulation of induced currents, means comprising flexible electrical connections between the conductors and the generator winding and flexible coolant couplings to the generator ends of the conductors for permitting thermal expansion of the conductors, and means for circulating coolant in a closed circuit first through the conductor coolant passages and then through the generator coolant system.

6. A polyphase electrical coupling between the output terminals of an electrical generator and a transformer, comprising a liquid cooled coupling conductor connecting each phase of the generator winding with the corresponding phase of the transformer, a second liquid cooled conductor for each phase connecting the generator winding with a neutral point, means for fixedly clamping each of said conductors at a point remote from the generator, each of said conductors comprising a substantially rigid tube extending continuously between the clamping point and the generator, a gas filled metal sheath surrounding each phase conductor, insulating supports locating the conductors axially within the respective sheaths whilst permitting relative axial movement, electrical connections between the ends of the phase sheaths to permit circulation of induced currents, and means comprising flexible electrical connections between the conductors and the generator winding and flexible coolant couplings to the generator ends of the conductors for permitting thermal expansion of the conductors.

7. A polyphase electrical coupling according to claim 6, wherein the phase conductors connecting the generator winding and the transformer are clamped at points remote from the generator and the transformer, flexible electrical connections and flexible coolant couplings being provided at both ends of the conductors to permit thermal expansion of the conductors towards the generator and transformer.

8. A polyphase electrical coupling according to claim 6, wherein the insulating supports which locate the conductors within the respective sheaths are biassed towards the conductors and carry at their inner ends rollers which bear against the conductors for permitting the conductors to move axially relatively to the sheaths.

References Cited
UNITED STATES PATENTS

| | | |
|---|---|---|
| 2,647,940 | 8/1953 | Swerdlow et al. |
| 2,706,744 | 4/1955 | Rudd. |
| 2,785,319 | 3/1957 | Simpson et al. _____ 307—147 |
| 2,874,207 | 2/1959 | Schymik. |
| 2,953,623 | 9/1960 | McNulty. |
| 2,992,290 | 7/1961 | Swerdlow. |
| 3,015,743 | 1/1962 | Skeats _____ 307—147 |
| 3,020,329 | 2/1962 | Deans. |

ROBERT K. SCHAEFER, Primary Examiner

T. B. JOIKE, Assistant Examiner

U.S. Cl. X.R.

174—13, 15, 99